March 10, 1970 C. W. NEWELL 3,499,619

TAPE DRIVE POWER TAKE-OFF SYSTEM

Filed April 29, 1968 5 Sheets-Sheet 1

INVENTOR.
CHESTER W. NEWELL
BY Fleh, Hohbach, Test, Albritton & Herbert
ATTORNEYS March 10, 1970 C. W. NEWELL 3,499,619

TAPE DRIVE POWER TAKE-OFF SYSTEM

Filed April 29, 1968 5 Sheets-Sheet 2

INVENTOR.
CHESTER W. NEWELL
BY Flehr, Hohbach, Test, Albritton & Herbert
ATTORNEYS March 10, 1970 C. W. NEWELL 3,499,619

TAPE DRIVE POWER TAKE-OFF SYSTEM

Filed April 29, 1968 5 Sheets-Sheet 3

INVENTOR
CHESTER W. NEWELL
BY Flehr, Hohbach, Test, Albritton & Herbert
ATTORNEYS INVENTOR.
CHESTER W. NEWELL
BY Flehr, Hohbach, Test, Albritton & Herbert
ATTORNEYS INVENTOR.
CHESTER W. NEWELL
BY Flehr, Hohbach, Test, Albritton, & Herbert
ATTORNEYS

United States Patent Office 3,499,619
Patented Mar. 10, 1970

3,499,619

TAPE DRIVE POWER TAKE-OFF SYSTEM

Chester W. Newell, Santa Clara, Calif., assignor to Newell Associates, Inc., Sunnyvale, Calif., a corporation of California

Filed Apr. 29, 1968, Ser. No. 725,109
Int. Cl. B11b *15/32;* B65h *17/42;* G03b *1/04*
U.S. Cl. 242—209 8 Claims

ABSTRACT OF THE DISCLOSURE

A number of tape cartridges of a type containing tape to be fed for recording or reproducing cooperates with a tape driving arrangement of mandrels, each of which is driven in one of two opposite directions at a given speed. By means of transfer roll operators, transfer rollers are moved into engagement with selected ones of the several mandrels for independently driving each of the tapes from the mandrels common to all of the tapes.

BACKGROUND OF THE INVENTION AND OBJECTS

This invention pertains to a multiple tape drive machine wherein each of a number of individual tapes can be fed in any of several modes of operation including: slow forward, fast forward, slow reverse, and fast reverse whereby each of the tapes can be individually and selectively operated simultaneously with the others even though operated in a different one of the foregoing modes.

Acordingly, in the multiple tape drive machine as herein disclosed, each tape may be independently driven from a common drive means whereby it can be played in either of two directions, quickly rewound, or quickly advanced to any desirable tape portion, all independently of the operations being carried out by others of the tape associated with the common drive mechanism.

It is a general object of the invention to provide an improved tape transport machine of a type employing multiple tapes.

It is another object of the invention to provide a multiple tape transport arrangement wherein each of a number of tapes may be independently operated in a plurality of modes of operation from a common drive means.

These and other objects, according to the invention, will be more readily understood from the following detailed description of a preferred embodiment of the invention when considered in conjunction with the accompanying drawing.

SUMMARY OF THE INVENTION

In general, according to the invention, there is provided a tape transport utilizing a plurality of tapes wrapped to form supply and take-up rolls. Continuously operating drive means, arranged in common to operate all tapes, serves to feed the tapes in various and independently selected modes of operation, including different speeds in each of two opposite directions. Operators have been arranged to selectively couple the tapes to the drive means for feeding the tapes in either of the two directions at any of the speeds.

DESCRIPTION OF THE PREFERRED EMBODIMENT

Figure 1:
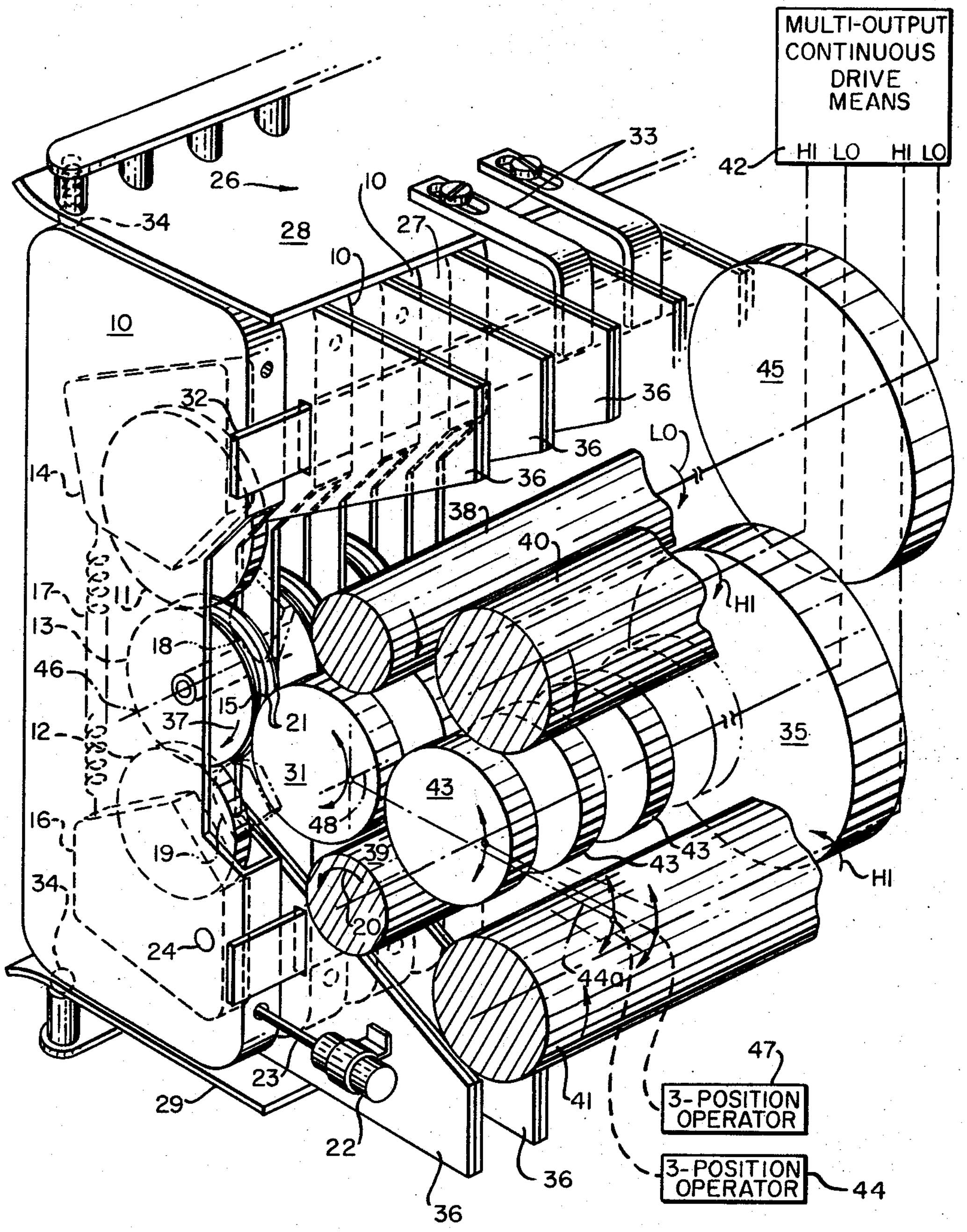
FIGURE 1 is a perspective view schematically representing tape transport apparatus, according to the invention.

As shown schematically in FIGURE 1, the multiple tape drive machine comprises a number of tape cartridge assemblies 10 arranged in side by side relation whereby each may be individually driven in any one of several modes of operation, including a fast forward, a fast rewind, a slow forward and a slow reverse mode of feeding recording tape wound to form supply and take-up rolls 11, 12 respectively.

The tape cartridge units 10, for example, may be of a type as disclosed in the co-pending patent application Ser. No. 725,113 entitled Tape Transport Apparatus and Interchangeable Cartridge Therefor and filed contemporaneously herewith Apr. 29, 1968 in the names of James W. F. Blackie, Ashley J. Hollingsworth and Chester W. Newell.

In the above identified patent application, there is disclosed a tape cartridge of the type shown herein wherein supply and take-up rolls 11, 12 are arranged to advance and retreat relative to a rotating idler 13 formed with a resilient tire 15 therearound. Thus, supply and take-up rolls 11, 12 are each carried to move with their pivoted carriages 14, 16 as drawn together by means of a spring 17. Transducers 18, 19 (shown in phantom lines) cooperate with tape wrapped about idler 13 as tape is fed from supply roll 11 to take-up roll 12 (and vice versa) by means of rotating the idler 13 via rotating contact formed with resilient flanges 21 flanking the tire portion 15 of idler 13.

Whichever of rolls 11, 12 is located on the take-up side of idler 13 will be urged with a greater force toward idler 13 so as to tension the intermediate span of tape about idler 13. For example, a solenoid 22 operates a push-rod 23 to be urged against carriage 16 so as to pivot the roll 12 toward idler 13 about pivot pin 24, all as described in the above identified patent application. The above force differential may also be obtained by using the principles of U.S. 3,370,804.

Figure 4:
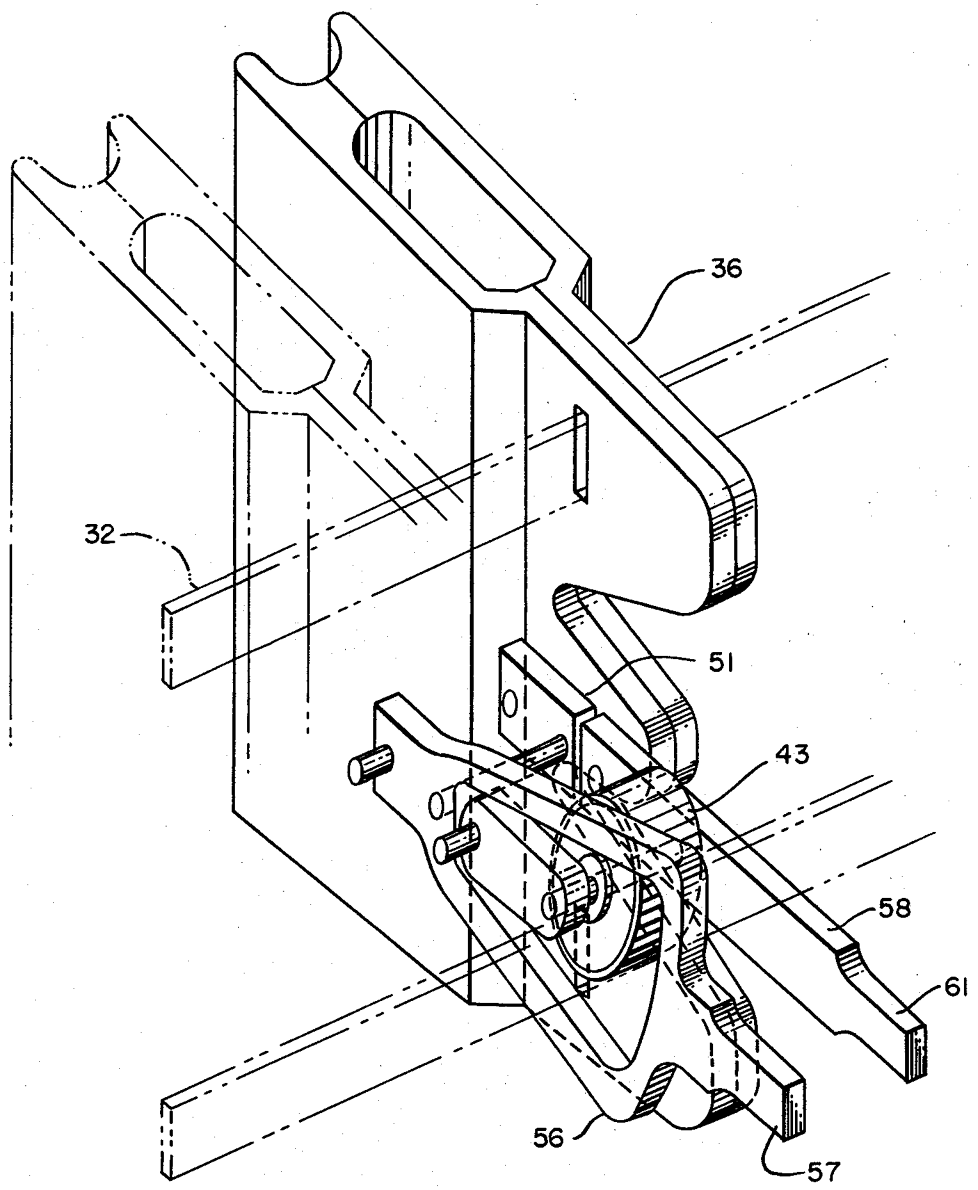
FIGURE 4 is a perspective view, in enlarged detail, showing side plate portions and transfer roller operator mechanism for apparatus, according to FIGURES 2 and 3.
Figure 5:
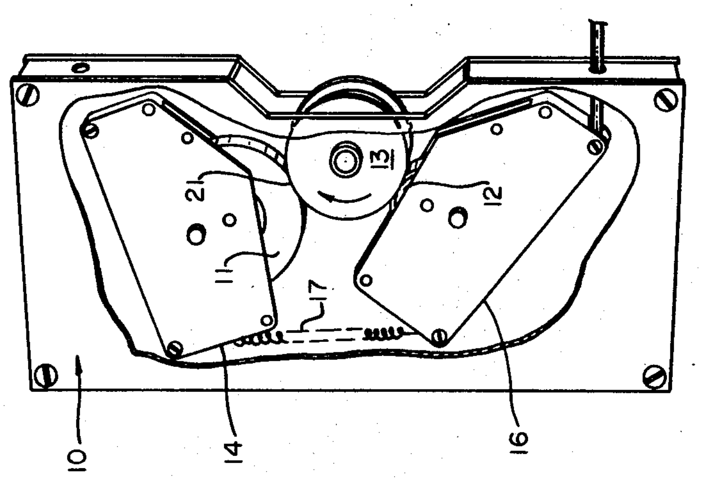
FIGURE 5 shows a tape cartridge construction of a type suitable for incorporation in the apparatus shown in the foregoing figures.
Figure 6:
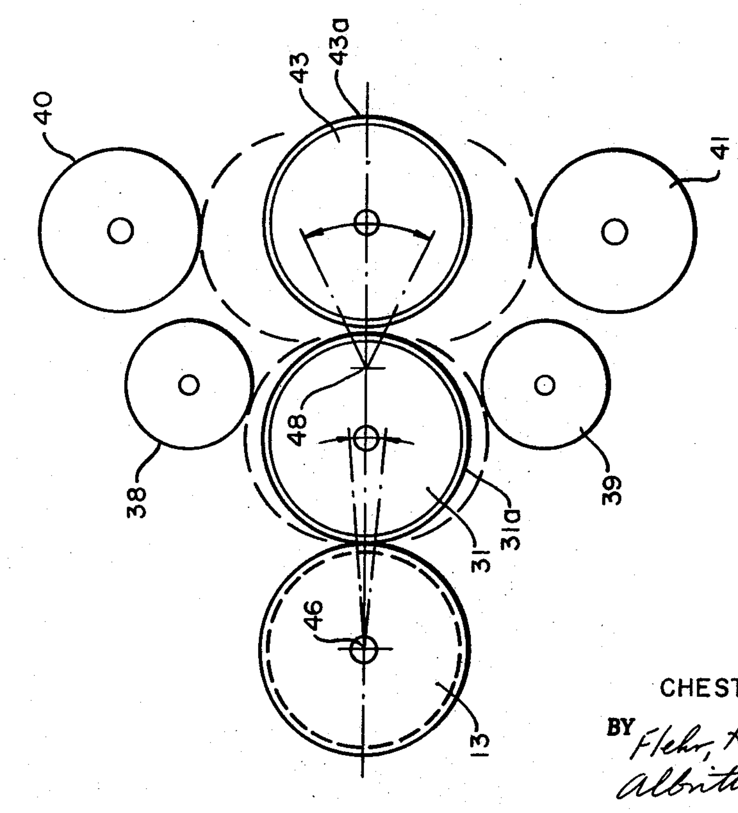
FIGURE 6 shows a diagram for explanation of operation of apparatus, according to the invention.

Means forming the cabinet or housing assembly 26 includes a number of individual cartridge-receiving zones 27 or "slots," each adapted to hold a tape cartridge unit 10 in side-by-side spaced relationship with other such units. Zones 27 are defined by the confronting surfaces of pairs of mounting plates 36, as best shown in FIGURE 4.

Housing assembly 26 can be formed in any suitable manner and includes top and bottom walls respectively designated 28, 29. Assembly 26 may be completed by employing suitable end plates (not shown) at the opposite ends of walls 28, 29.

Means serving to register the inner edge of each cartridge unit 10 in a position whereby during operation each idler 13 engages the periphery of a transfer roller 31 includes a transversely extending registration bar 32 supported by adjustably positionable hangers 33 attached to housing assembly 26.

Thus, each unit 10 may be inserted by moving it in its own plane into its associated "slot" or zone 27 until the inner edge of unit 10 abuts the registration face of bar 32. At that time, and in order to continuously urge each unit 10 into registration with bar 32, spring-loaded detents 34 serve to engage the upper and lower rounded corners of each unit 10 and thereby retain same in the foregoing registered position.

In general, the system for driving each of idlers 13 in any of the foregoing several modes of operation is best illustrated schematically in FIGURE 1.

Accordingly, as noted above, each idler 13 when rotated feeds tape from one tape roll 11 to the other 12, as in the direction of arrow 37. As noted, during operation, transfer roller 31 rides against idler 13 whereby rotation of any given transfer roller 31 serves to operate the idler 13 of its associated tape unit 10.

Means, as now to be described, supplies a continuously operative drive means common to all tape units 10 for feeding the tape thereof in any of the various modes.

As shown in FIGURE 1, a plurality of four continuously rotating drive mandrels 38–41 have been operatively coupled at their ends to any suitable multiple output continuous drive means of known construction such as represented schematically by the diagram 42. For example, power take-off devices employing various output spindles powered from a single synchronous motor can be employed.

The diameters of mandrels 38–41 and the speed of operation may be readily established as desired to provide the intended appropriate output movement to idlers 13. For ease in explanation, it is assumed, herein, that mandrels 38, 39 represent a continuous driving arrangement for operating respectively at a low forward tape speed and a low reverse speed. Similarly, mandrels 40, 41 rotate in a manner to provide respectively a relatively high forward speed and reverse mode of operation. Flywheels 35, 45 are carried with mandrels 38, 39, for example, to store kinetic energy in condition to be immediately available for application to reverse the tape movement. The stored kinetic energy in any given flywheel should be at least an order of magnitude greater than the kinetic energy to be transferred into the rotating and moving elements of the tape system.

Thus, a number of so-called "high speed" transfer rollers 43 cooperate with mandrels 40, 41 while the "low speed" transfer rollers 31 cooperate with the low speed mandrels 38, 39.

By moving any given transfer roller 31 upwardly by means of its associated and suitable three-position operator 44 acting through a linkage represented by the dotted line 44*a*, a selected transfer roller 31 engages mandrel 38 to be rotated by the latter. The upward pivoting movement of each transfer roller 31 is centered about an axis 46 substantially coaxially of the axis of rotation of idlers 13. Accordingly, as a given transfer roller 31 is moved upwardly or downwardly, the resilient contacting interface defined between roller 31 and idler 13 will be maintained whereby rotation imparted to the selected transfer roller 31 by mandrel 38 is transmitted to its associated idler 13.

Each operator means 44 further serves to move transfer roller 31 downwardly into engagement with mandrel 39 for similar operation of idler 13 in a reverse direction.

An additional three-position operator 47 has been associated with each of the high speed transfer rollers 43 for moving them similarly upwardly and downwardly about a transversely extending pivot axis 48. Such movement of rollers 43 causes them to simultaneously engage one or the other of the high speed mandrels 40, 41 and also an associated transfer roller 31 so as to drive idlers 13 at a high speed in either of two opposite directions.

The outer periphery of each of transfer rollers 31, 43 has been prepared with a resilient tire (identified respectively as 31*a* and 43*a*) for enhanced friction engagement.

Figure 2:
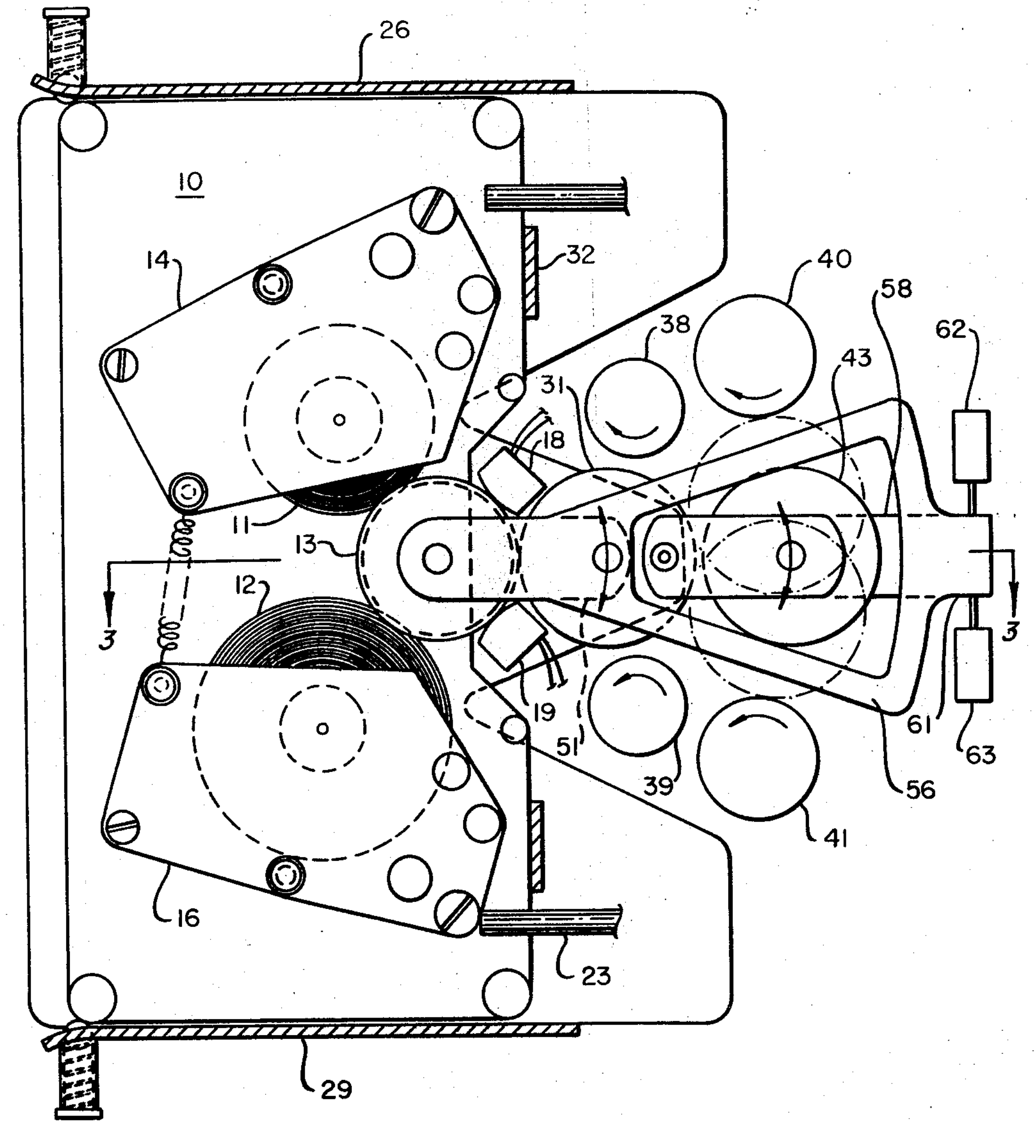
FIGURES 2 and 3 are respectively side elevation and plan views, in section, of typical modular portions of apparatus, according to the invention, and for carrying out the functions shown in the schematic view of FIGURE 1.
Figure 3:
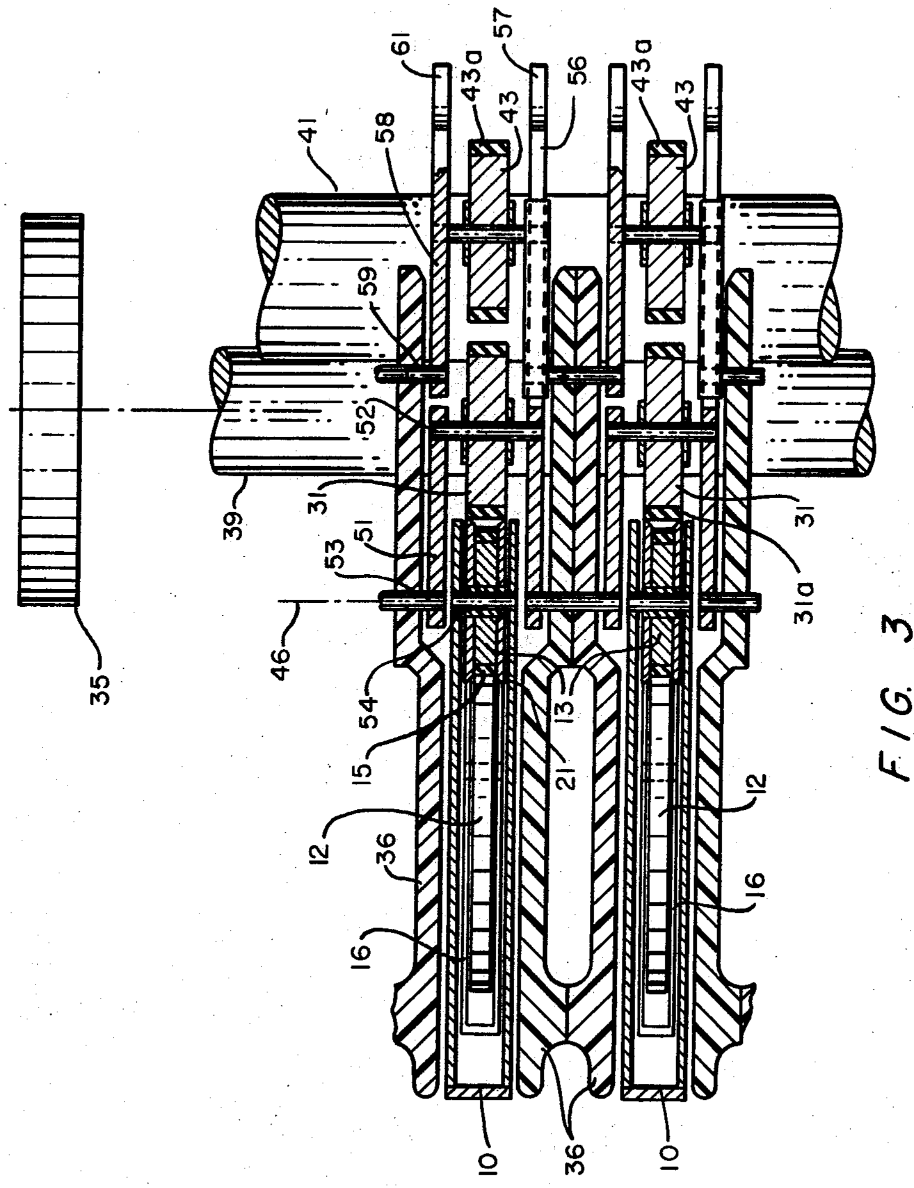

Having in mind the foregoing general style of operation of the system disclosed herein with particular reference to FIGURES 2 through 4, a detailed construction showing a typical portion of a number of identical units is disclosed, as follows, for carrying out the functions referred to above.

A pivotally supported yoke 51, including an axle 52, supports each of the rollers 31 for rotation about axle 52. Each yoke 51 pivots, by means of the outwardly extending pins 53, about a pivot axis 46 disposed coaxially of the axle 54 of idler 13. The length of each yoke 51 has been defined in a manner whereby the tire 31*a* of transfer roller 31 rides in operative engagement with the resilient flanges 21 of idler 13.

Means for moving roller 31 upwardly and downwardly into and out of engagement relative to mandrel 39 includes yoke 51 having a yoke extension portion 56 adapted to extend sufficiently forwardly and outwardly of the zone or "slot" 27 containing each unit 10 whereby a tab portion 57 may be engaged and moved upwardly or downwardly or positioned midway between.

Yoke extension portion 56 has been formed with widely spaced portions, joined at their outer ends to accommodate the included disposition of a second yoke 58 carrying the transfer rollers 43 in a similar fashion. Yokes 58 pivot about the mounting pins 59 supported in the confronting surfaces of plates 36. Yoke 58 includes a suitable tab portion 61 protruding to a sufficient degree whereby it may be readily gripped or engaged by an operator and moved upwardly or downwardly from a neutral position so as to engage roller 43 with the continuously operating drive mandrels 40, 41 respectively, as desired.

From the foregoing, it will be readily apparent that any one or more of a number of tapes may be fed relative to their respective transducers in a simultaneous operation merely by manipulation of yokes 51, 58 of various ones of the units.

Where more than a few such simultaneous operations are desired to be conducted at any given time, it may be desirable to employ remotely controlled operators 62, 63 of any known type such as, for example, a three-position solenoid employing a first and second positivetly operated position and a neutral position intermediate same connected to operate yokes 51, 58.

In certain systems quick reversal of the direction of tape movement may be employed to minimize undesired gaps in the recorded information being sensed from or applied to the tape. In the apparatus disclosed herein, for example, mandrels 38, 39 contain considerable stored kinetic energy in flywheels 35, 45 immediately available for application to reverse the tape movement. These same flywheels 35, 45 further serve to minimize momentary speed fluctuations referred to as "flutter" so as to improve the quality of the information transduced with respect to the tape.

What is claimed is:

1. In a tape transport a plurality of tapes wrapped to form supply and take-up rolls, drive means common to said tapes and continuously operating in a plurality of directions and at a plurality of speeds in each of said directions for selectively feeding said tapes at a selected one of a plurality of speeds in each of two opposite directions, and means serving to selectively couple the tapes to said drive means for feeding the tapes in either of said directions at any of said speeds.

2. In a tape transport according to claim 1 wherein the last named means serves to simultaneously couple any plurality of said tapes to said drive means for operation individually in any and different ones of their modes of operation simultaneously.

3. In a tape transport according to claim 1 wherein said drive means cooperates with the last named means for simultaneously coupling any plurality of said tapes to said drive means for operation individually in any and different ones of their modes of operation simultaneously.

4. In a tape transport apparatus, a plurality of tape units, each said unit including a length of recording tape wrapped to form supply and take-up rolls and a rotatable body for feeding the tape between said rolls, individual, rotatable transfer rollers each respectively associated with one of said bodies of the units, said transfer rollers each serving to rotate an associated one of the said bodies, continuously operating drive means forming a power supply for operating said transfer rollers, and means selectively operable to couple one or more of said rollers to said drive means to feed the tape of the units associated therewith.

5. In a tape transport apparatus, a plurality of tapes wrapped to form supply and take-up rolls, first and second drive means continuously operating respectively in each of two opposite directions and common to all said tapes, and means selectively serving to operatively couple the tapes to said drive means to be fed in said directions.

6. In a tape transport apparatus a plurality of tapes each wrapped to form supply and take-up rolls, means for selectively driving one or more of said tapes, said means comprising individual rollers respectively associated with each tape and movable to drive one of the tapes, a plurality of mandrels each disposed for peripherally driving said rollers, means serving to continuously drive said mandrels in each of two opposite directions and at substantially different speeds to provide a drive mandrel for fast forward, slow forward, fast reverse, and slow reverse modes of feeding tapes, and means serving to move selected ones of said rollers in driving relation with any of said mandrels to transfer the movement of the mandrel to feed the tape associated with such roller according to the speed and direction of the mandrel.

7. In a tape transport, a length of tape wrapped to form supply and take-up rolls, an annular rotatable resilient body engaging the periphery of the rolls in driving relation to each, first and second continuously operating drive means operable to independently cooperate in driving relation to rotate said body, and means serving to selectively operably couple the body to either said first or second drive means to the exclusion of the other for feeding the tape.

8. In a tape transport according to claim 7 wherein one of said first and second drive means includes means storing kinetic energy in condition to be immediately available for application to change the tape movement, said storing means having kinetic energy at least an order of magnitude greater than that of said rolls and body.

References Cited

UNITED STATES PATENTS

| | | | |
|---|---|---|---|
| 3,140,360 | 7/1964 | Whitworth | 179—100.2 |
| 3,280,947 | 10/1966 | Brewster et al. | 179—100.2 X |
| 3,298,006 | 10/1967 | Milenkovic et al. | 340—174.1 |

LEONARD D. CHRISTIAN, Primary Examiner

U.S. Cl. X.R.

226—111